March 21, 1933. L. C. BADGLEY 1,901,889
WINDROWING MACHINE
Filed March 20, 1930 5 Sheets-Sheet 1
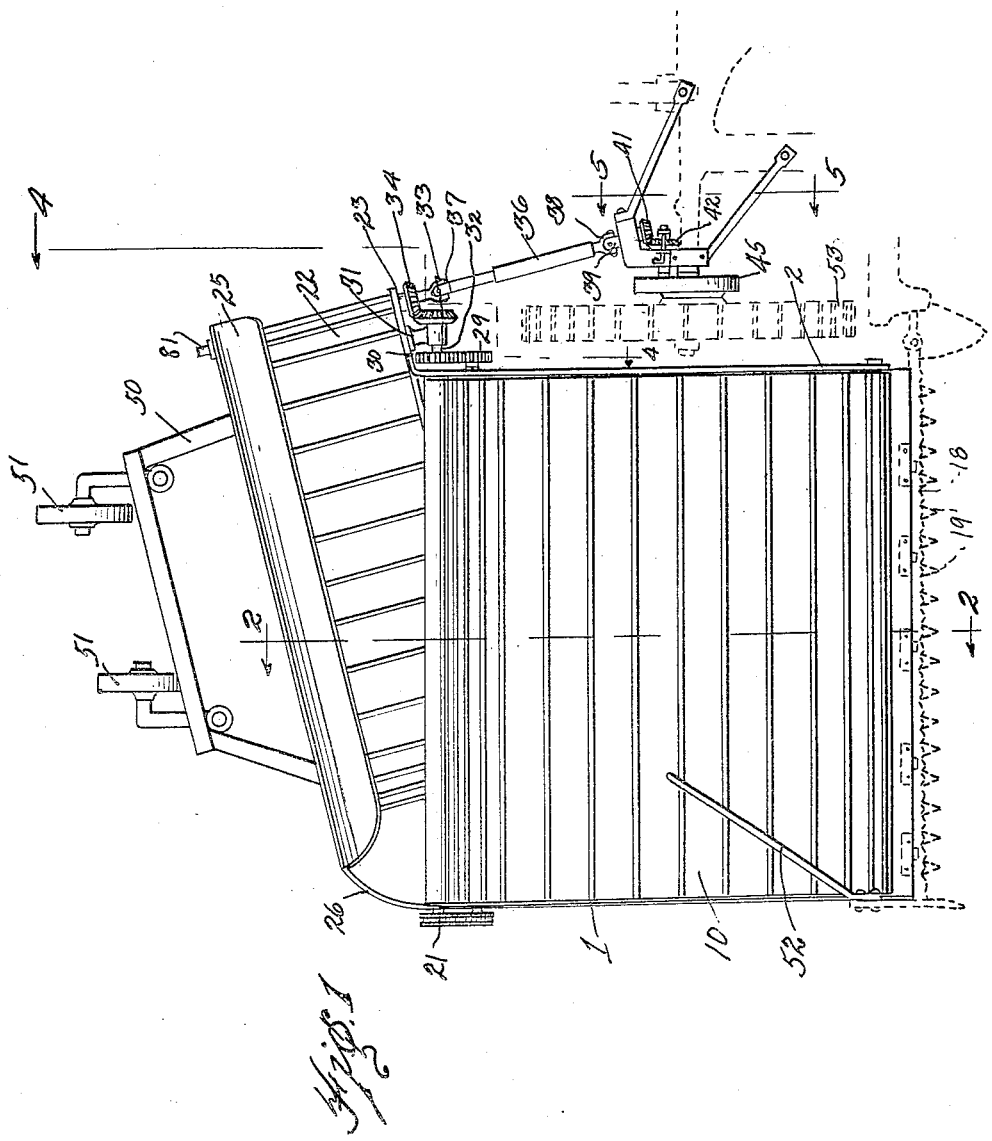
INVENTOR.
L.C. BADGLEY
BY
ATTORNEY.

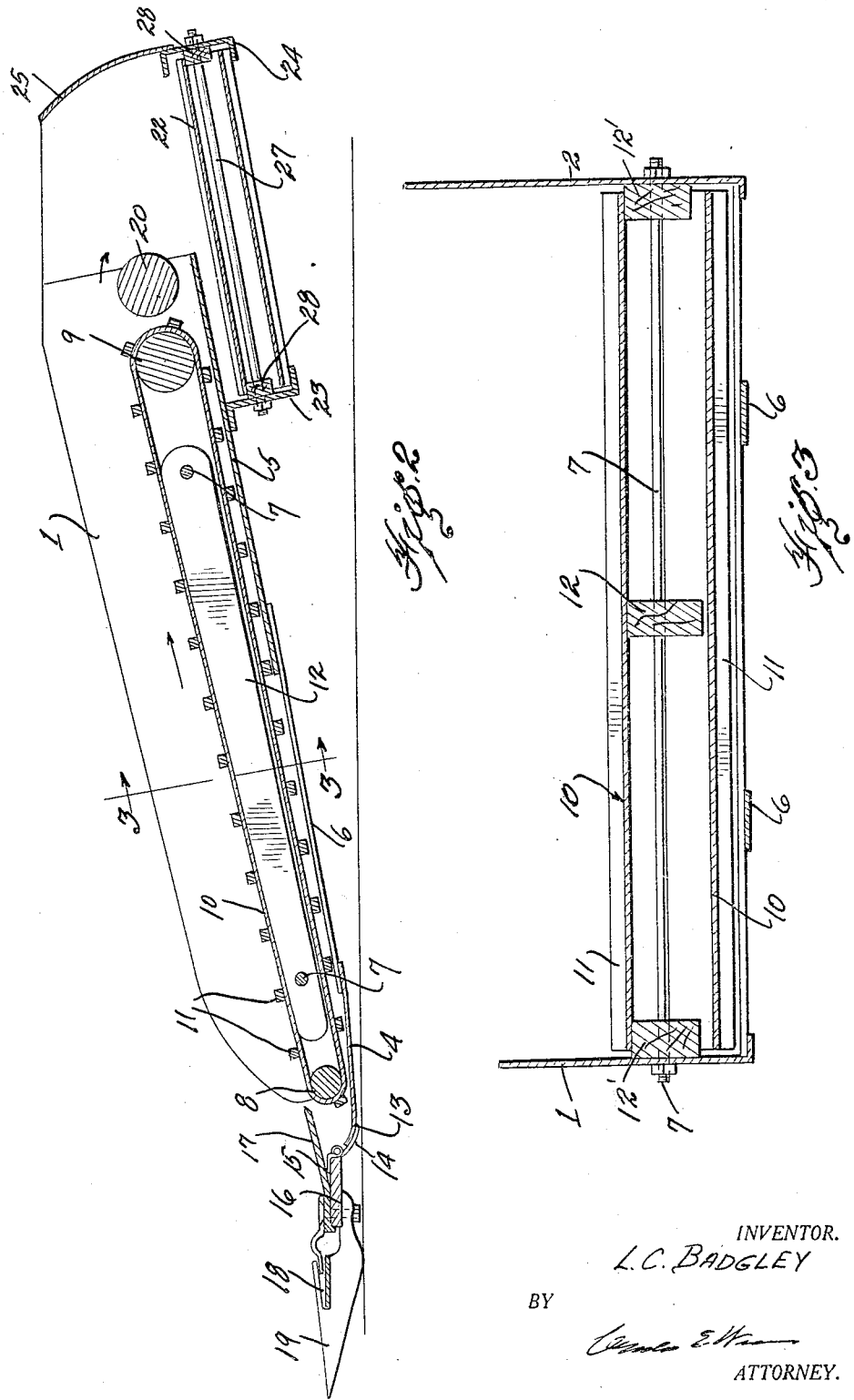

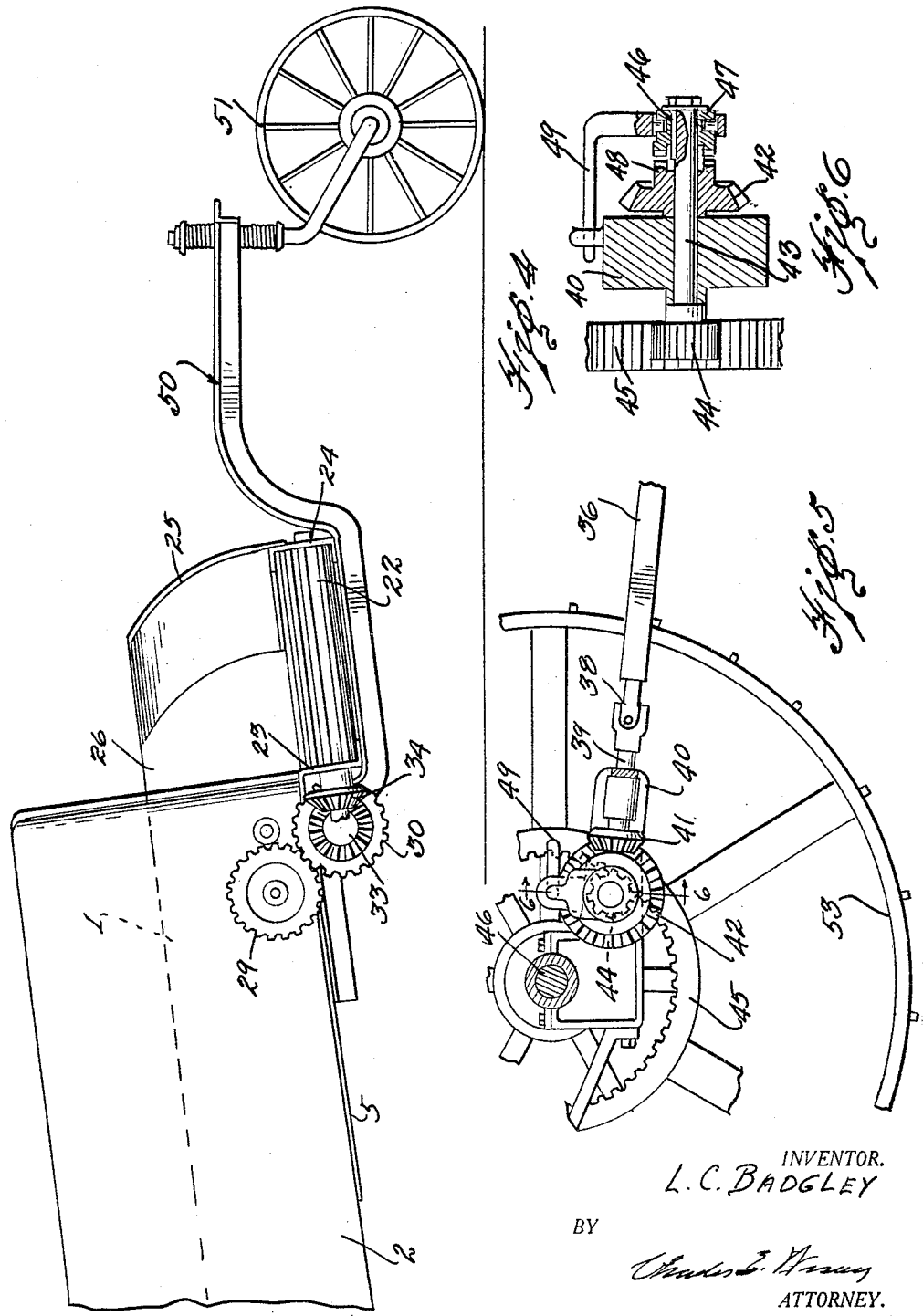

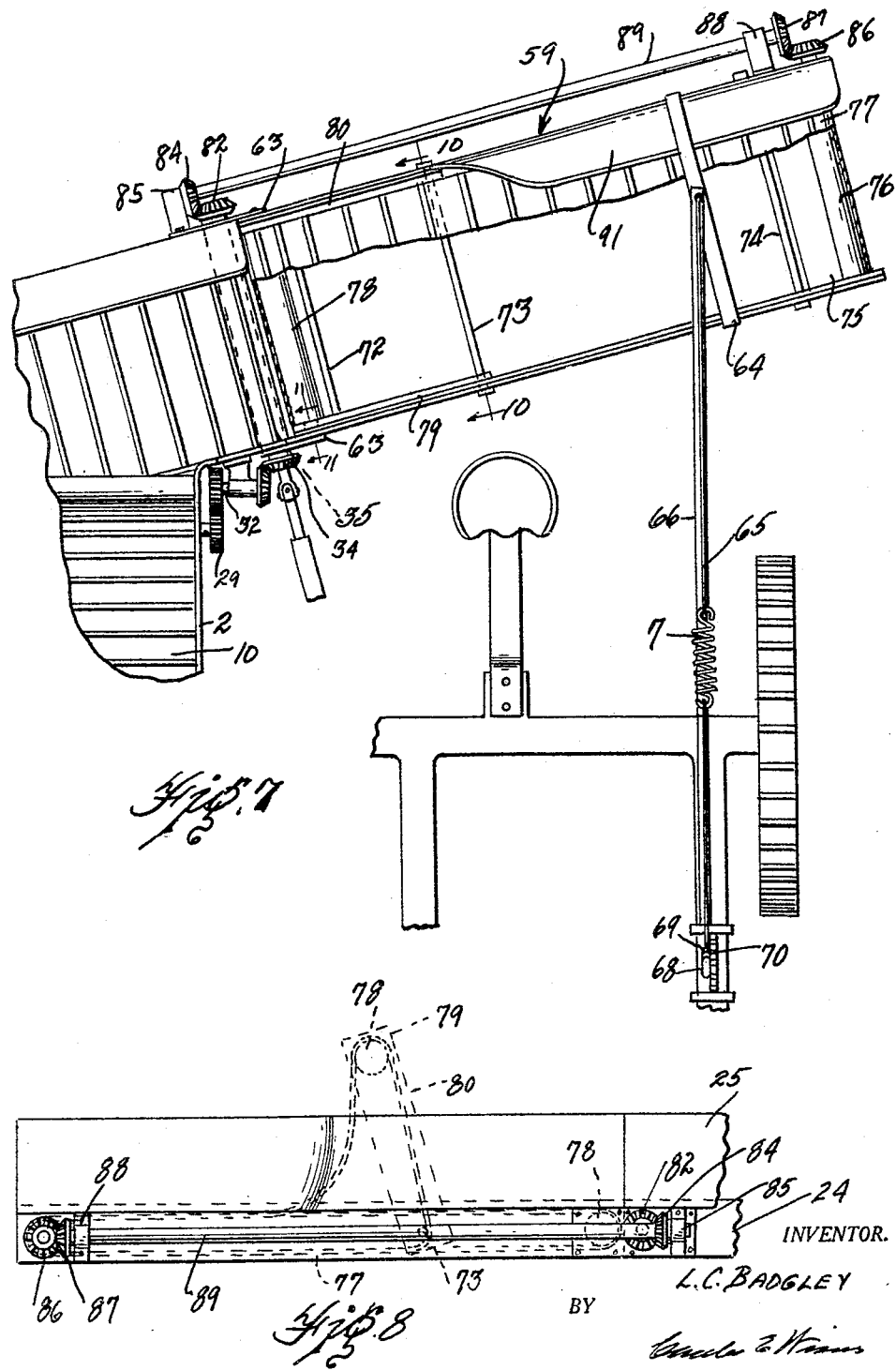

March 21, 1933.  L. C. BADGLEY  1,901,889
WINDROWING MACHINE
Filed March 20, 1930  5 Sheets-Sheet 5

INVENTOR.
L. C. BADGLEY
BY
ATTORNEY.

Patented Mar. 21, 1933

1,901,889

UNITED STATES PATENT OFFICE

LAURIE C. BADGLEY, OF BOISE, IDAHO, ASSIGNOR OF ONE-HALF TO ROBERT C. CHATTIN, OF BOISE, IDAHO

WINDROWING MACHINE

Application filed March 20, 1930. Serial No. 437,326.

This invention relates to windrowing machines of the type adapted for use with a mowing machine. An object of the invention is to provide a device of this character which may be quickly and easily attached to a mowing machine of standard construction.

Another object of the device is to provide a windrowing machine consisting of an endless belt traveling in the opposite direction to the travel of the mowing machine and which carries the cut material rearwardly to a second endless belt traveling in a plane at right angles to the other endless belt and which deposits the cut material in a windrow in the rear of the mowing machine.

Another object of the device is to provide a windrower having mowing blades positioned at the front end of an endless belt, the belt carrying the cut material rearwardly of the mowing blades and then depositing it upon a second endless belt traveling at right angles to the first belt and depositing the cut material in a single or double windrow, as desired, in the rear of the mowing machine and in which both the endless belts are dependent for their movement upon the movement of the ground wheels of the mowing machine.

Another object of the invention is to provide a device of this character which will handle light forage or seed crops without any threshing action being imparted to the cut material and in which the stems of the cut material are left inverted to allow the foliage to remain in the center of the windrow.

These objects and the several novel features of the invention are hereinafter more fully described and claimed and the preferred form of construction by which these objects are attained is shown in the accompanying drawings in which—

Fig. 1 is a top plan view of my improved windrower attached to a mowing machine, the several parts of the mowing machine being shown in dotted lines.

Fig. 2 is an enlarged section taken on line 2—2 of Fig. 1.

Fig. 3 is an enlarged section taken on line 3—3 of Fig. 2.

Fig. 4 is an enlarged section taken on line 4—4 of Fig. 1.

Fig. 5 is an enlarged section taken on line 5—5 of Fig. 1.

Fig. 6 is a detail section taken on line 6—6 of Fig. 5.

Fig. 7 is a top plan view of the extension that is used when making a double windrow.

Fig. 8 is a rear view of the extension showing the drive mechanism for operating the endless belt.

Figure 9:
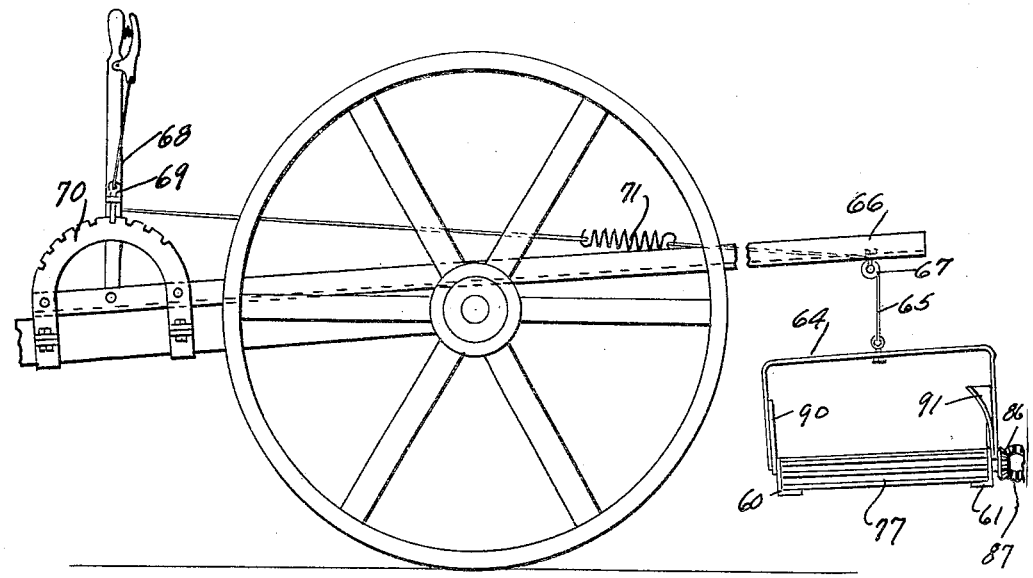
Fig. 9 is a side elevation of the same attached to a mowing machine.
Figure 10:
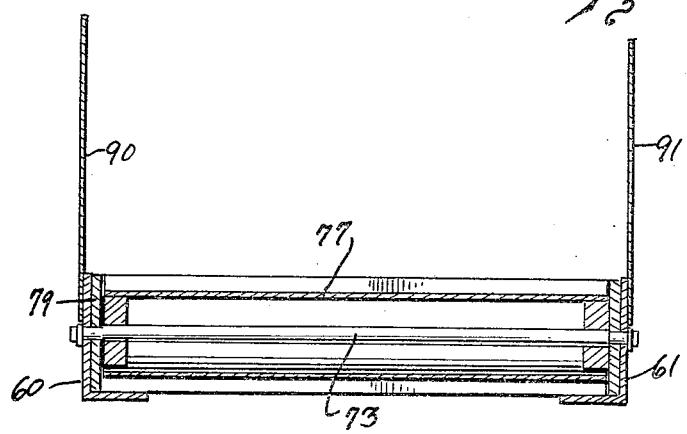
Fig. 10 is a section taken on line 10—10 of Fig. 7.

Referring now to the drawings, wherein like reference characters indicate like parts throughout the several views the windrower consists of the side plates 1 and 2 extending above the top plane of the endless belt 10. The lower end of the side plates 1 and 2 are welded or otherwise secured to the front and rear cross plates 4 and 5 respectively. A pair of longitudinally extending plates 6 are preferably welded to the front and rear cross plates 4 and 5 respectively. Suitable tie rods 7 extend between the side plates 1 and 2 and clamp the same together to form a rigid rectangular frame in which the front and rear rollers 8 and 9 are mounted, the ends of the rollers being carried in suitable bearings mounted in the side plates 1 and 2 respectively.

An endless canvas belt 10 extends over the rollers 8 and 9 and has the cross bars 11 mounted thereon. The belt 10 is supported at its center by means of the longitudinally extending strip 12 carried by the tie rods 7. The cross bars 11 on the face of the endless belt next to the ground will ride more or less upon the cross plates 4 and 5 and the longitudinally extending plates 6 to a degree dependent upon the looseness of the canvas belt 10. Suitable longitudinally extending strips 12′ are secured to the side plates 1 and 2 and support the outer edges of the endless conveyor 10.

As will be noted from Fig. 2 the front cross plate 4 is curved upwardly at its forward edge as indicated at 13 and has secured thereto suitable hinged members 14 for pivotal engagement with the hinge members 15 mounted upon the rear edge of the sickle bar 16.

A transverse plate 17 is mounted upon the top side of the sickle bar and extends between the side plates 1 and 2 the purpose of which is to close the space between the rear end of the sickle bar 16 and the roller 8. The mowing blades 18 and 19 being of standard construction will not be further described as they are operated in a conventional manner from the ground wheels of the mowing machine proper. As will also be seen in Fig. 2 the rear end of the transverse plate 17 slopes upwardly and in the same angular plane as the top face of the belt 10 thus providing a smooth elevated surface for the cut material to be moved to the belt 10 from the mowing blades.

As illustrated in Figs. 1 and 2 a transverse roller 20 is mounted in the frames 1 and 2 and to the rear of the roller 9. The roller 20 rotates in the same direction as the direction of travel of the belt 10 and is driven from the roller 9 by the chain 21 extending over suitable sprocket wheels mounted upon one end of the rollers 9 and 20. The object of the roller 20 is to prevent the cut material from being carried toward the front end by the transverse bars 11 mounted upon the belt 10. The motion of the roller 20 will cause the cut material on the belt 10 to be delivered to an endless belt 22 traveling at right angles to the belt 10. The belt 22 is carried upon suitable rollers mounted between the frames 23 and 24 respectively and may be kept taut by suitable tension means not shown.

The frame 23 is approximately Z shaped in cross section and the upper flange of the Z is preferably welded to the lower face of the transverse plate 5. The frame 24 is approximately channel shaped in cross section and has the guard plate 25 welded or otherwise secured to it. The plate 25 preferably forms a continuation of the side frame 1 through the medium of the curved plate 26. The frames 23 and 24 are secured together by the tie rods 27 and are provided with the longitudinally extending bars 28 for supporting the upper face of the belt 22. The lower face of the belt 22 is guided on the lower flanges of the frames 23 and 24 extending toward each other. As will be clearly seen from Fig. 1 the angle of the belt 22 in relation to the belt 10 is a little greater than ninety degrees, preferably about one hundred and five degrees.

As is best indicated in Fig. 1 the end of the roller 9 nearest the mowing machine proper is provided with a spur gear 29 meshing with a similar gear 30 carried in a bearing 31 mounted upon the side frame 23. The gear 30 is mounted on a shaft 32 and a beveled gear 33 is mounted upon the opposite end of the shaft 32. The beveled gear 33 meshes with a similar gear 34 carried by the roller 35, the said roller 35 engaging the belt 22 nearest the mowing machine. A telescoping shaft 36 is provided with the universal joints 37 and 38, the universal joint 37 engaging the roller 35 while the universal joint 38 engages a shaft 39 mounted in a casting 40.

The shaft 39 has the beveled gear 41 mounted on the end of the shaft opposite to the end engaging the universal joint 38. A beveled gear 42 engages the gear 41 and as best seen in Figs. 5 and 6 the gear 42 is loosely mounted upon the shaft 43 extending through the casting 40. One end of the shaft 43 has the spur gear 44 mounted thereon for engagement with the internal gear 45 mounted upon the axle 46 of the mowing machine. The opposite end of the shaft 43 has a key or spline 46 mounted therein and a clutch member 47 engages the shaft 43 and the spline 46 for rotatable and slidable movement with the same. As will be noted from Fig. 3, the beveled gear 42 is provided with a clutch face 48 for engagement with the clutch member 47 when the said clutch member 47 is moved toward the casting 40 by means of the handle 49.

The rear end of the windrower has the frame 50 secured thereto and the extreme rear end of the frame 50 carries the trailing ground wheels 51 the same being resiliently mounted in the rear end of the frame 50.

As will be seen in Fig. 1 a deflector 52 is secured to the outer end of the cutter bar the purpose of which is to tend to force the cut material away from the side frame 1.

The operation of this part of the device is as follows:

When the mowing machine is moving forward the ground wheel 53 through suitable standard clutch mechanism (not shown) will impart rotation to the internal gear 45 and assuming that the clutch members 47 and 48 are in engagement rotation will be imparted to the beveled gears 42 and 41 and then through the medium of the telescoping shaft 36 and the universal joint 37, rotation will be imparted to the beveled gears 34 and 33, and since the gear 30 is mounted upon the shaft 32 rotation will be imparted to the gear 30 and the gear 29 mounted upon the roller 9. Inasmuch as the chain 21 engages a sprocket upon one end of the roller 20 rotation will be imparted to the roller 20 and the belt 10 in a direction as indicated by the arrows in Fig. 2. Likewise the roller 35, being driven by the beveled gear 34, and engaging the belt 22 the said belt 22 will have its upper face moved toward the mowing machine proper or away from the belt 10. The blades 18 and 19 at this time will be reciprocating and the cut material will be delivered upon the belt 10 and carried rearwardly thereof by the transverse bars 11. The material will then be delivered over the roller 20 and onto the moving belt 22 and inasmuch as the belt 22 has its upper face moving toward the mowing machine the cut material will be delivered in a windrow in rear of the mowing machine proper.

It will be noted that the outward travel of the belt 22 together with the curved guard 25 will give the material a rolling or turning effect which causes the cut material to be delivered from the belt 22 into a perfect windrow, and inasmuch as the delivery of the cut material is done so easily and smoothly no threshing action will be imparted thereto and consequently a large saving will be effected particularly in the handling of seed crops.

As shown in Figs. 7, 8, 9, 10 and 11 an extension 59 is provided in line with the endless belt 22. The extension consists of the side frames 60 and 61 in line with the side frames 23 and 24 respectively and secured thereto by means of the side plates 63 which may be riveted to the sides 60 and 61 and bolted to the side frames 23 and 24 to facilitate assembly of the extension 59 to the said frames 23 and 24. The outer end of the extension 59 has the bail 64 attached thereto, as best seen in Figs. 7 and 9. The center portion of the bail is provided with an eye bolt for receiving one end of the flexible cable 65. An angle iron 66 is secured to the main body of the mowing machine and the rear end is provided with a pulley 67 over which the cable 65 is adapted to pass. The opposite end of the cable 65 is connected to a handle 68 having a pawl attachment 69 connected thereto for engagement with the arcuate member 70. A stiff spring 71 is positioned intermediate the ends of the cable 65 thus forming a flexible support for the outer end of the extension 59, the inner end of the extension 59 being secured to the side frames 23 and 24 as heretofore described.

Figure 11:
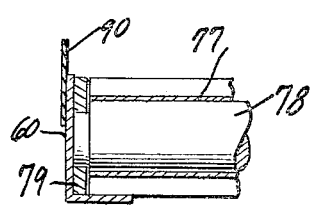
Fig. 11 is a section taken on line 11—11 of Fig. 7.

Suitable tie rods 72, 73 and 74 extend between the side frames 60 and 61 for tying the two together. A cross plate 75 extends between the two side frames 60 and 61 and is preferably welded thereto. A roller 76 is mounted between the side frames 60 and 61 and near the outer end thereof over which an endless belt 77 is adapted to pass. Another roller 78 is carried between the side frames 79 and 80, as best seen in Figs. 7 and 11. The ends of the frames 79 and 80, opposite to the ends that carry the roller 78, are pivotally mounted upon the tie rod 73 for a purpose to be later described.

As will be seen from Fig. 1, one end of the roller 35 extends through the side frame 24 as indicated at 81. When it is desired to use the extension 59 a beveled gear 82 is mounted upon the end 81 of the roller 35 and engages with the beveled gear 84 mounted in the bearing 85 carried by one of the plates 63. In like manner the beveled gear 86 is mounted upon one of the ends of the roller 76 for engagement with the beveled gear 87 mounted upon the shaft 89 carried in the bearings 85 and 88.

As will be noted from Fig. 7 the extension 59 forms a complete unit and when it is desired to assemble it with the other part of the windrower it is only necessary to fasten the beveled gear 82 upon the extension 81 and then bolt the plates 63 to the side frames 23 and 24, respectively. It will be further seen from Fig. 7 that the endless belt 77 travels in the same direction as the belt 22.

When the extension 59 is in position for use the cut material will pass from the endless belt 22 to the belt 77 and be delivered from the outer end of the said belt in a windrow in rear of the mowing machine. When the extension 59 is attached to the windrower and it is not desired to use the same the inner end of the frames 79 and 80 carrying the roller 78 therebetween will be swung up to a position as shown by dotted lines in Fig. 8, the said frames 79 and 80 being pivoted upon the tie rods 73 will permit this movement.

The side frames 60 and 61 are provided with the shields 90 and 91 respectively, the shield 91 aligning with the shield 25 and being bolted thereto if desired. The shield 91 must be vertical the length of the side frame 80 to allow clearance for the frame 80 when it is swung in the position shown in dotted lines in Fig. 8.

The movement of the train of gears 82, 84, 87 and 86 will cause the belt 77 to travel in the same direction as the travel of the belt 22. The purpose of the extension 59 is to permit the forming of a double windrow where the crop to be cut is so light as to make a single windrow undesirable.

The operation of this part of the device is as follows:

While the first swathe is being cut the side frames 79 and 80 will be in the position as shown in dotted lines in Fig. 8, thus allowing the cut material to pass over the end of the belt 22 to form a windrow in rear of the mowing machine.

When the next swathe is cut the side frames 79 and 80 will be lowered thus causing the cut material to pass from the belt 22 onto the belt 77 and be delivered on top of the first windrow. Thus on every succeeding travel of the mowing machine the side frames 79 and 80 will be alternately raised and lowered at each end of the swathe that is cut. It will thus be clearly seen that for every two swathes that are cut only one windrow will be formed. This applies only when one machine is in use but where two machines or any multiple thereof are in use every alternate one will be provided with the extension and the same object will be attained, namely—the forming of a single windrow for a double cut of the mowing machine.

It will be noted by reference to Fig. 1 that the cut material will be distributed along the front edge of the endless belt or conveyor 10 and as the material is carried rearwardly of the mowing blade the deflector 52 will tend to force the material away from the side frame 1, and as it is carried farther back from the deflector 52 the material on the conveyor 10 away from the mowing machine will be delivered to the conveyor 22 near its rearward edge, while the material in the center of the conveyor 10 will be delivered approximately to the center of the conveyor 22. In like manner the material that is on the conveyor 10 nearest the mowing machine will be delivered to the conveyor 22 along its forward edge.

It is to be understood that although three points of delivery were mentioned in the foregoing description the material in reality will be delivered across the full width of the conveyor 22.

From the foregoing description it will be evident firstly that my improved machine harvests a crop of various kinds adapted for this mode of harvesting in a new manner, that is, that the cut crop of whatever nature is delivered without material detrimental effect in its form and without threshing the seeds from a seed crop and deliver the same therefrom in unimpaired condition in a windrow the most convenient form for the harvesting to remove the same from the field and that the construction described is only one of the forms of construction of an apparatus adapted to harvest a crop in the manner stated. It is further to be observed that the term "forage crop" as here used in the specification and claims is intended to mean any of the grain or seed crops that are adapted to be cut by a mowing machine.

It will also be understood from the foregoing description that the various objects of the invention are attained by the preferred form of construction described, and that the construction may be varied in many ways without departing from the spirit and scope of the invention as set forth in the appended claims.

Having thus fully described my invention, its utility and mode of operation, what I claim and desire to secure by Letters Patent of the United States is—

1. In a device of the character described, the combination with means for cutting a forage crop, of an endless apron having transverse bars providing a conveyor for carrying the cut material rearwardly of the cutting means, a roller lying parallel with the discharge end of the apron and providing a means for carrying the material from the apron to beyond the discharge end of the apron and a second endless apron positioned below and at an angle to the roller at the discharged end of the first apron for discharging the cut material in the form of a windrow.

2. In a device of the character described, the combination with means for cutting a forage crop, of an endless apron providing a conveyor of a width approximately equal to the width of the cutting means, and a second endless apron providing a conveyor positioned at the rear of the first conveyor, the first apron discharging its material in a straight line practically parallel with the cutting means and the second conveyor lying at such angle thereto that the material from the first apron is delivered practically in a straight line diagonally across the second apron whereby the material is practically uniformly distributed on the second apron, for discharging the cut material from one end thereof.

3. In a device of the character described, the combination with means for cutting a forage crop, of an endless conveyor for carrying the cut material rearwardly of the cutting means, said conveyor being of the apron type and having a discharge end parallel with the cutting means, and a second endless conveyor so positioned that the cut material from the first named conveyor will be delivered approximately uniformly across the full width of the second conveyor and discharged from the end thereof in the form of a windrow.

4. In a device of the character described, the combination with means for cutting a forage crop, of an endless conveyor of a width at least equal to the width of the cutting means, for carrying the cut material rearwardly of the cutting means, said conveyor having its discharge end positioned parallel with the cutting means, and a second endless conveyor of a length equal to the approximate width of the first conveyor and so positioned in relation to the first named conveyor that the cut material will be delivered approximately uniformly across the full width thereof and discharged from the outer end thereof in the form of a windrow.

5. A windrowing attachment for mowing machines having a sickle bar and a driving wheel comprising an upwardly inclined framework hingedly and detachably supported at its forward end to the sickle bar, means at the rear end for supporting the frame, an endless apron carried by the forward portion of the framework, the forward end of which is positioned adjacent to and rearwardly of the sickle bar and parallel therewith, a guide means extending from the sickle bar to adjacent the forward end of the apron whereby cut material may pass thereonto, a second conveyor consisting of an apron supported at the rear end of the framework and movable in a direction transversely of that of the first apron, said second apron being below the discharge end of the first apron and lying at such angle thereto that the material passing from the end of the first conveyor member is distributed practically uniformly diagonally across the second apron, said second apron discharging its material to the rear of the machine away from the standing crop, said second apron having a driving roller, gearing between said driving roller and the rear roller of the first apron, and means for detachably connecting the same with the driving wheel of the mowing machine.

6. A windrowing attachment for mowing machines having a sickle bar and a driving wheel by which the sickle is operated, comprising an upwardly inclined framework detachably supported at its forward end to the sickle bar, wheeled means at the rear end for supporting the framework, rollers in the framework parallel with the sickle bar, an endless apron supported on the rollers, the forward one of which is positioned to the rear of the sickle bar, means extending from the sickle bar to adjacent the lower end of the apron whereby cut material may pass onto the apron, a second endless apron at the rear of the framework positioned below and extending at an angle greater than ninety degrees to the first apron, rollers for said second apron, the discharge end of the first apron lying at an angle diagonally across the second apron whereby material is discharged practically uniformly across the second apron, a driving means common to a roller of both aprons detachably connected with the driving wheel of the mowing machine, and means operable at will for connecting or disconnecting the driving means with the conveyor rollers.

7. A windrowing attachment for mowing machines having a frame, a sickle bar and a driving wheel comprising in a detachable unit an upwardly inclined framework detachably supported at its forward end to the sickle bar and at one side toward the rear detachably supported by the mowing machine frame, wheeled means for supporting the rear end of the frame distant from the point of support on the mowing machine frame, an apron conveyor on the inclined framework adapted to receive material from the rear of the sickle bar and discharge the same on a line practically in parallel relation therewith, a second conveyor forming part of the detachable unit supported at the rear end of the inclined framework and beneath the discharge end of the first conveyor and lying at such angle thereto that material discharging from the first conveyor is distributed practically uniformly diagonally across the surface of the second conveyor, and a common driving means for the conveyor detachably connected with the driving wheel of the mowing machine.

8. In a device of the character described, the combination with a means for cutting a forage crop including a sickle bar, of an endless conveyor for carrying the cut material rearwardly of the sickle bar, the receiving end of the conveyor being supported by and to the rear of the sickle bar and the discharge end occupying a straight line practically parallel with said bar, and a second conveyor positioned below and at such angle to the discharge end of the first conveyor that the material from the first conveyor is delivered approximately in a straight line diagonally across the second conveyor from near the outer corner of its receiving end to near the inner corner of its discharge end whereby the cut material is practically uniformly distributed on the second conveyor and discharged from the end thereof in the form of a windrow through movement of the device.

In testimony whereof I sign this specification.

LAURIE C. BADGLEY.